(12) United States Patent
Sodo

(10) Patent No.: US 10,874,492 B2
(45) Date of Patent: Dec. 29, 2020

(54) WATER SUPPLY NOZZLE FOR ORAL HYGIENE

(71) Applicant: INIZIATIVA CENTRO SUD S.R.L., Naples (IT)

(72) Inventor: Diego Sodo, Naples (IT)

(73) Assignee: INIZIATIVA CENTRO SUD S.R.L., Naples (IT)

( * ) Notice: Subject to any disclaimer, the term of this patent is extended or adjusted under 35 U.S.C. 154(b) by 178 days.

(21) Appl. No.: 16/094,534

(22) PCT Filed: May 4, 2017

(86) PCT No.: PCT/IB2017/052604
§ 371 (c)(1),
(2) Date: Oct. 18, 2018

(87) PCT Pub. No.: WO2017/195076
PCT Pub. Date: Nov. 16, 2017

(65) Prior Publication Data
US 2019/0117354 A1    Apr. 25, 2019

(30) Foreign Application Priority Data

May 11, 2016   (IT) .......................... 102016000048277
May 11, 2016   (IT) .......................... 102016000048286

(51) Int. Cl.
*A61C 17/028*    (2006.01)
*A61C 17/22*    (2006.01)
(Continued)

(52) U.S. Cl.
CPC .............. *A61C 17/028* (2013.01); *A46B 9/04* (2013.01); *A46B 11/002* (2013.01);
(Continued)

(58) Field of Classification Search
CPC ... A61C 17/028; A61C 17/222; A46B 11/002; A46B 11/063; A46B 9/04; A46B 2200/1066; A61H 13/00; A61H 13/005
(Continued)

(56) References Cited

U.S. PATENT DOCUMENTS 3,736,923 A * 6/1973 Parkison .............. A61C 17/032
                                                     601/163
3,828,771 A    8/1974 Gartner
(Continued)

FOREIGN PATENT DOCUMENTS

CH          518 130       1/1972
DE          196 45 644 A1    5/1998
(Continued)

OTHER PUBLICATIONS

International Search Report Corresponding to PCT/IB2017/052604 dated Sep. 27, 2017.
(Continued)

*Primary Examiner* — Quang D Thanh
(74) *Attorney, Agent, or Firm* — Davis & Bujold PLLC; Michael Bujold

(57) ABSTRACT

A water supply nozzle for oral hygiene and, in particular, to a nozzle or pick to be mounted on a water supply system for oral hygiene that includes a head for the dispensing of water jets that alternate and converge at one point, in association with cleaning bristles. The nozzle preferably includes an internal venturi duct for passage of water that is connected externally through an air intake hole for the mixing with water.

10 Claims, 11 Drawing Sheets

(51) Int. Cl.
*A46B 9/04* (2006.01)
*A46B 11/06* (2006.01)
*A46B 11/00* (2006.01)

(52) U.S. Cl.
CPC .......... *A46B 11/063* (2013.01); *A61C 17/222* (2013.01); *A46B 2200/1066* (2013.01)

(58) Field of Classification Search
USPC ..................... 601/160, 162, 163, 165, 169
See application file for complete search history.

(56) References Cited

U.S. PATENT DOCUMENTS

| | | | |
|---|---|---|---|
| 6,245,032 B1 | 6/2001 | Sauer et al. | |
| 2006/0057539 A1* | 3/2006 | Sodo | A61C 17/032 433/80 |
| 2007/0113374 A1* | 5/2007 | Joshi | A46B 5/0095 15/405 |
| 2007/0140777 A1* | 6/2007 | Brunson | A46B 11/063 401/289 |
| 2007/0203439 A1* | 8/2007 | Boyd | F04B 49/24 601/162 |
| 2009/0082706 A1* | 3/2009 | Shaw | A61C 17/032 601/165 |
| 2013/0034829 A1 | 2/2013 | Choi | |

FOREIGN PATENT DOCUMENTS

| | | |
|---|---|---|
| EP | 2 946 748 A1 | 11/2015 |
| GB | 1 335 146 | 10/1973 |
| WO | 02/094119 A1 | 11/2002 |

OTHER PUBLICATIONS

Written Opinion Corresponding to PCT/IB2017/052604 dated Sep. 27, 2017.

* cited by examiner

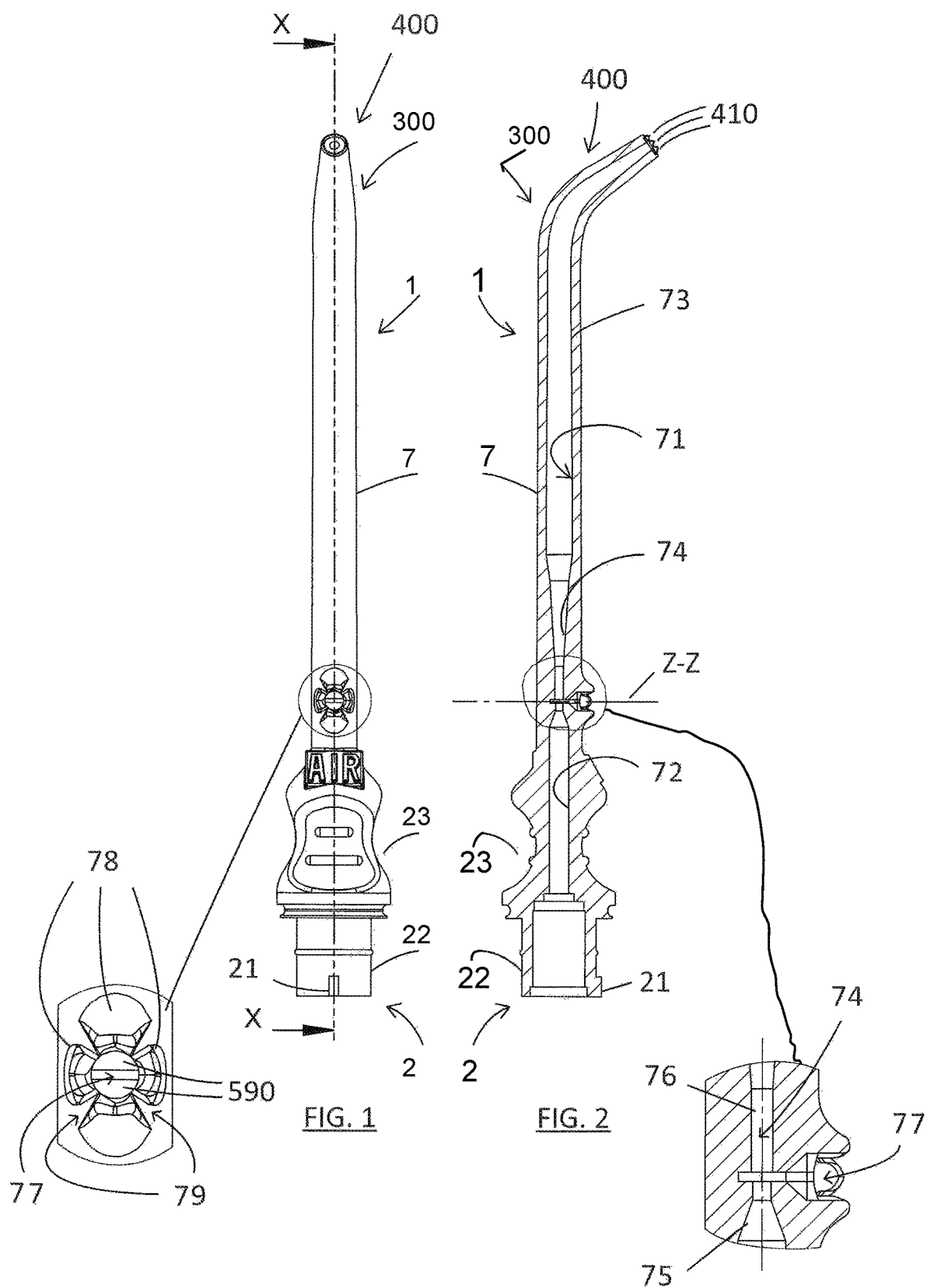

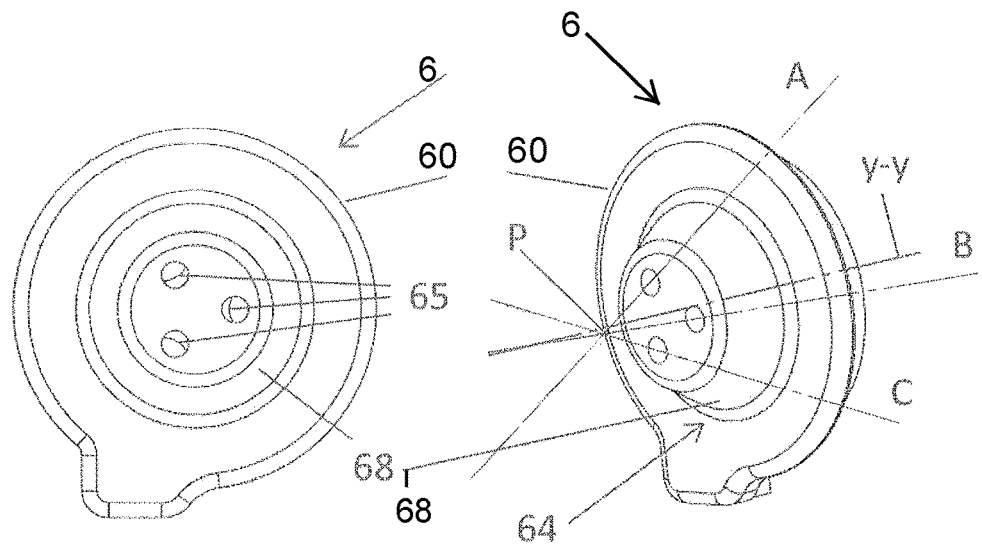
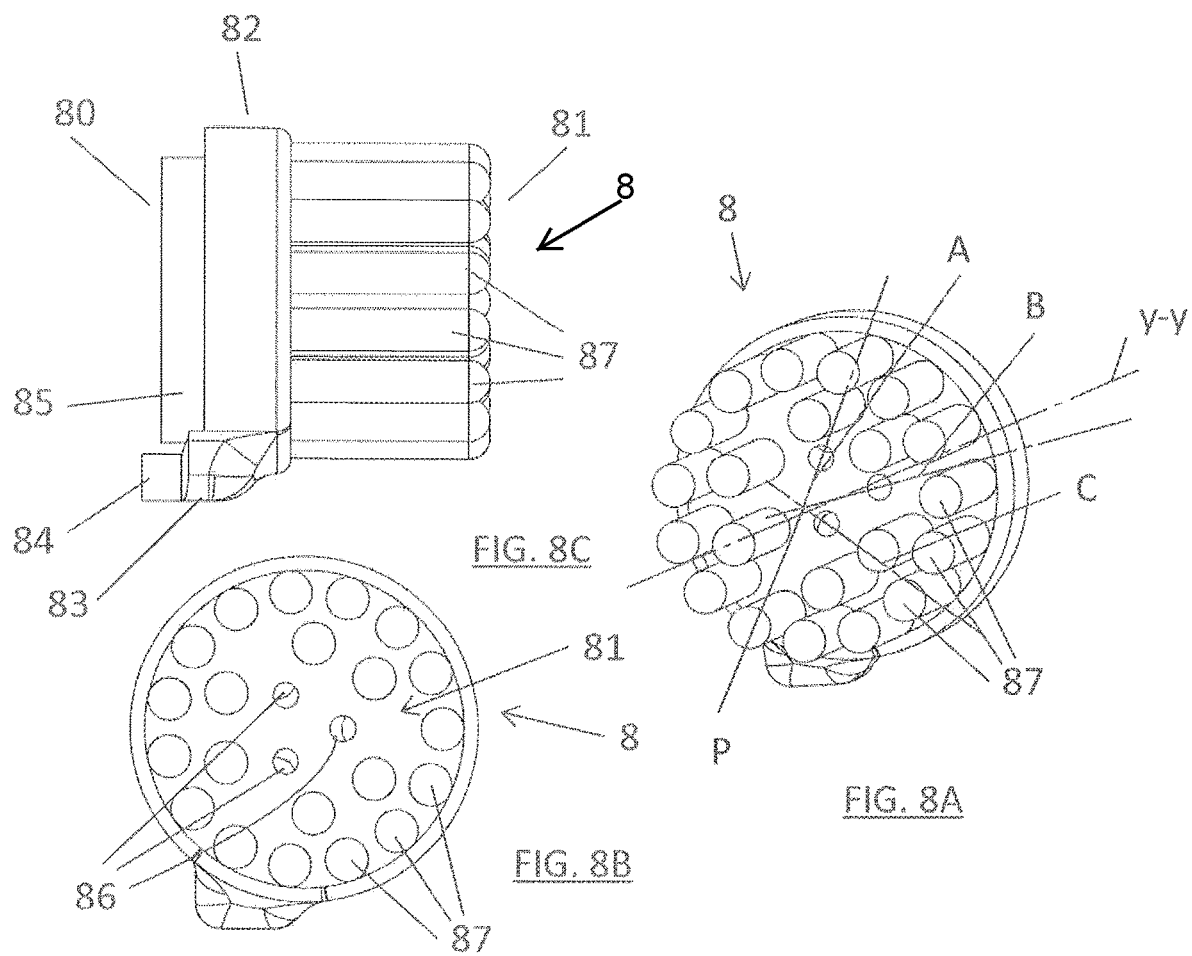

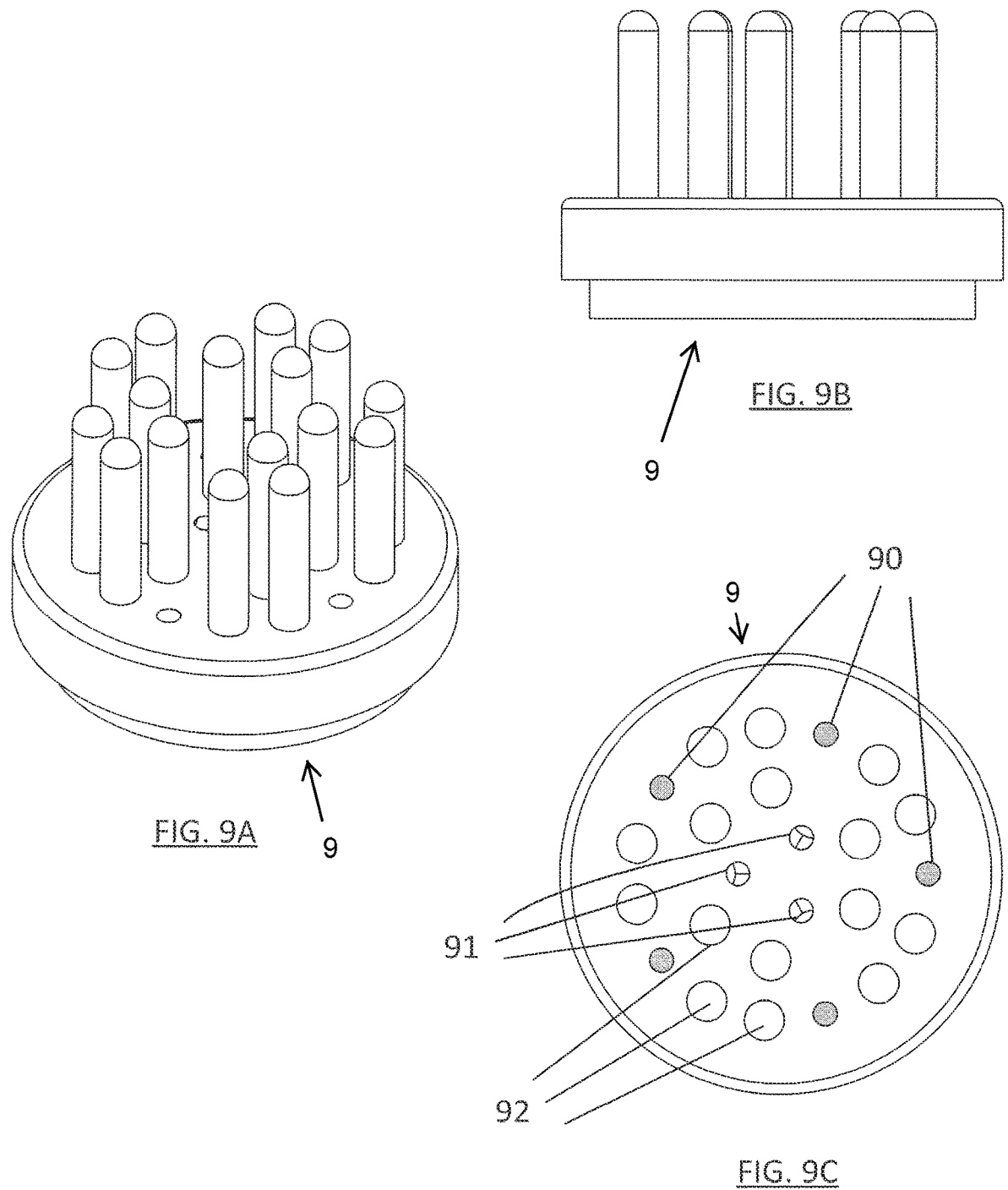

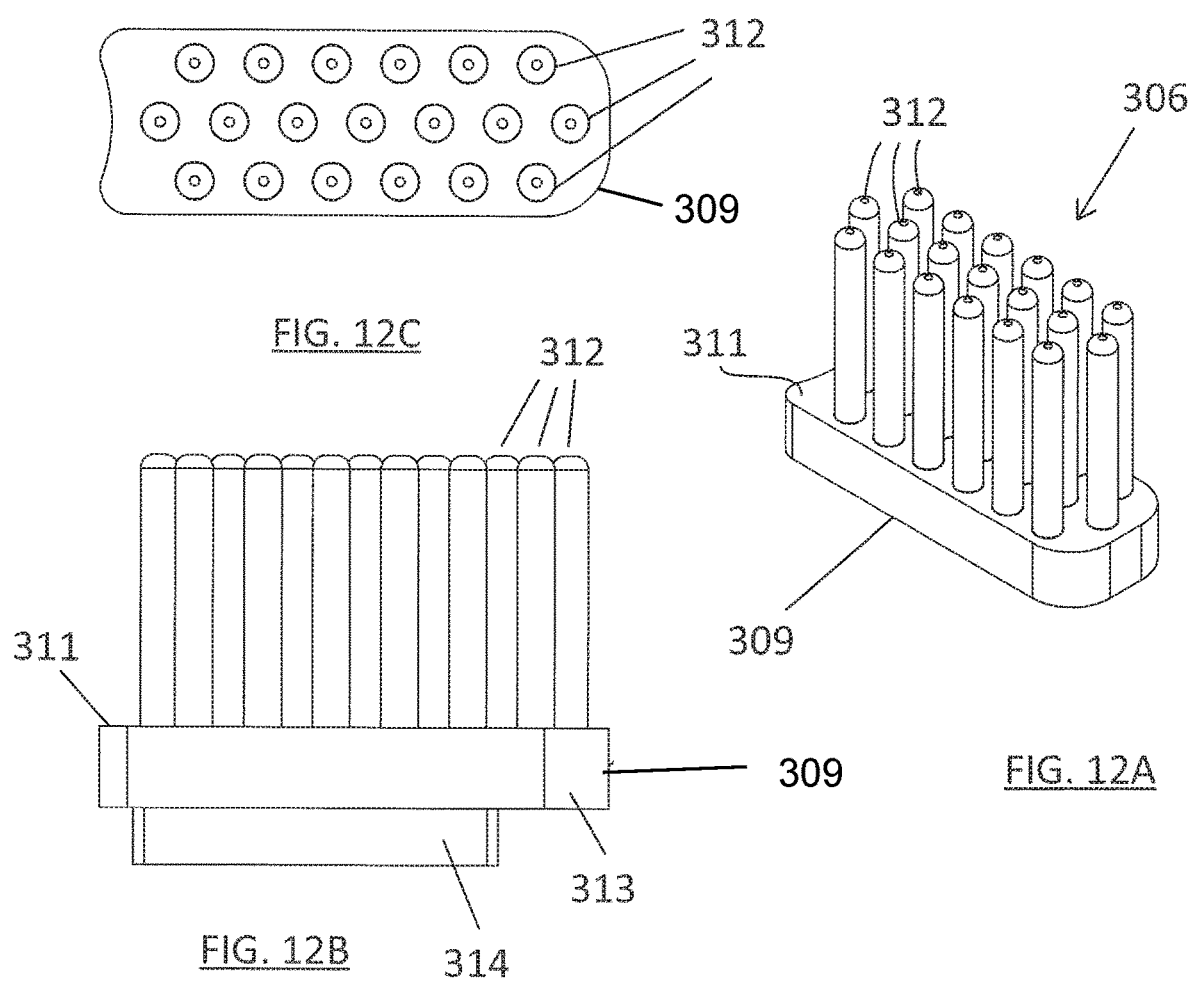

WATER SUPPLY NOZZLE FOR ORAL HYGIENE

TECHNICAL SECTION OF THE INVENTION

The present invention refers to a water supply nozzle of an oral hygiene waterpik and, in particular, to a nozzle or pick to be mounted on a water delivery system for oral hygiene consisting of a head with an improved cleaning effect and preferably equipped with improved hygienic capacity.

BACKGROUND TECHNOLOGY

In the field of oral hygiene, for a long period of time, there have been devices of different features, ranging from the very common toothbrush, flosser and dental floss to the more sophisticated devices, including electric brushes and water jets systems.

Notably, manual toothbrushes have a head with a set of bristles that are rubbed on teeth and gums to mechanically remove plaque and food residue. The equivalent electric toothbrushes differ for the movement of the head's electric motor that simulates a rotating, alternating and sometimes pulsating manual motion, but at a much higher speed and thus with a faster cleaning effect. In fact, the cleaning effectiveness of electric toothbrushes does compel quick brushing which can cause serious irritations, in particular for those who suffer from particular dental pathologies such as gingivitis. In addition, the strong vibrations these toothbrushes transmit to the teeth and, by extension, to the bones of the mandible and jaw are considered particularly annoying to some users.

In addition to or in combination with the aforementioned cleaning systems, devices such as water jet dispensers, also called waterpiks or waterjets, have also been developed. These devices precisely use water dispensed under pressure possibly in combination with the mechanical action of a bristle head.

Generally, waterpiks are divided into four types:
electric waterpik with a container for holding water, along with a pump connected to an irrigating pick that allows dental cleaning;
battery operated waterpik where the same functions are carried out by a smaller sized device but with a much smaller water container;
waterpik connected directly to the bathroom faucet with special adapters that draw in water irrigated at a pressure required for proper functioning;
manual waterpik with a small hand-operated pump and a small water container located in the handle.

With all four types, various types of picks with various types of cleaning functions can be used on these devices, such as picks with variable water jet flows, picks with built-in bristles, and picks with flossers etc.

In particular, all commercial picks have the feature of having one or more pulsating or continuous jets that are parallel to each other. Although its cleaning action is generally considered satisfactory, it has been observed that the water jet tends to remove the plaque or food residues but without giving off an optimal hygienic effect. In fact, on the one hand, this kind of jet—linear or pulsating—it is not able to completely remove plaque and food residue due to the anatomy of teeth and gums that create interdental spaces with very narrow slits and converging surfaces, so bits of food residue and plaque remain between those spaces and are known to be carriers or a breeding ground for the growth of harmful bacteria for gums and teeth.

It follows that the use of water jets used with these devices cannot guarantee optimal hygienic action.

To resolve this problem there is an electric waterpik on the market, that comprises a water container connected to a water dispensing pump through a nozzle dispenser, in association with an additional pump for a mixture of air with this water in order to create a water jet containing microbubbles. The oxygen effect is known to give off a disinfectant effect on the mechanical removal of water.

This type of waterpik is, therefore, advantageous from the point of view of the sanitizing effect. However, the device appears to be bulky because from a constructive point of view it is quite complex seeing that it requires at least one pump to dispense water mixed with air bubbles. In addition, the more complex a device is, the greater the chances of malfunctioning, the complexity of its realization and the high cost of production.

SUMMARY OF INVENTION

The technical problem at the basis of this invention is to design a water dispenser nozzle for dental hygiene that is able to efficiently remove plaque and food residue, considerably improve the sanitized effect of a waterpik device and at the same time resolve the structural complexity of well-known waterpiks. Another technical problem is the optimization of the cleaning effect of the water jet.

This problem is resolved by a water dispenser nozzle capable of automatically directing the water jet of different angles thanks to a simple construction and preferably allows the mixing of air with the water taken from the container or directly from the domestic water network, without the need for electrically powered pumps.

BRIEF DESCRIPTION OF FIGURES

Additional features and advantages of the nozzle according to the present invention will become apparent from the following description of some embodiments given as a pure non-limiting example, wherein:

FIG. 1 is a schematic front view of a water supply nozzle for oral hygiene with an enlarged detail, according to the present invention;

FIG. 2 is a schematic side and sectional view along the X-X line of the nozzle in FIG. 1 with an enlarged detail;

FIG. 7A is a schematic axonometric view of a first element of the head of the nozzle of FIG. 4A, according to a first embodiment of the invention;

FIG. 7B is a schematic front view of the embodiment of FIG. 7A;

FIG. 8A is a schematic axonometric view of a second element of the head of the nozzle of FIG. 4A, according to a second embodiment of the construction of the invention;

FIG. 8B is a schematic front view of the element of FIG. 8A;

FIG. 8C is a schematic side view of the element of FIG. 8A;

FIGS. 9A, 9B, and 9C respectively represent an axonometric view from the front, a side view and a plan view of a third component of the head of the nozzle, according to a third embodiment of the construction of the invention;

FIGS. 12A-12C respectively represent an axonometric, lateral and planar schematic view of an element of the head of FIG. 11;

DETAILED DESCRIPTION OF THE INVENTION

Figure 3A:
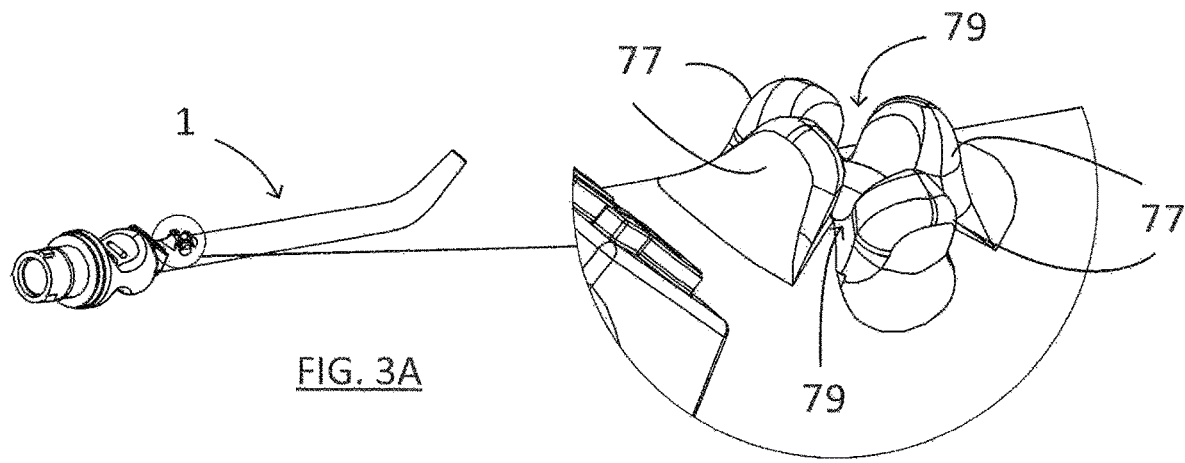
FIG. 3A is a schematic axonometric view from the bottom of the nozzle in FIG. 1 with an enlarged detail.

The idea behind the present invention is that to automatically perform an alternation of water jets pointed at one point alternately, but with different inclinations, creating a vortex effect of the water at the point of impact that is to be achieved. In this way, the cleaning capacity of the head is optimized by its washing function with pressure water as well as the only circular mechanical effect that draws out the residue part from the tooth or the gingival space that is to be cleaned. This point where the jets meet is obtained by an inclination of the jets and supporting teeth which together optimize the positioning of this meeting point. Also, preferably, the dispenser nozzle must at least allow the same performance of dispenser nozzles associated with electric waterpiks that mix with air. However, the object is to avoid the complex construction of said electric waterpiks that mix with air.

For this purpose, as shown in FIGS. 1 and 2, with reference number 1 indicating a dispenser nozzle that extends longitudinally along an X-X axis, preferably rectilinear. Nozzle (1) comprises a first end (2) of attachment to a waterpik or water supply device and a second end (3) for the outlet of pressurized water ending with a cleaning head (4) (FIGS. 4A-4B) or a nozzle (400) dispenser (FIGS. 1-3), said first and second ends are then connected by an elongated portion (7) preferably rectilinear and internally hollow so as to allow the water to flow between the aforementioned first and second ends.

The first end of attachment (2) as best shown in FIG. 1, generally comprises the attachment pieces (21) for the waterpik eventually assisted by O-ring type seals (22). Furthermore, this first end may preferably include a gripping portion (23) in order to facilitate the hold of the nozzle during the engaging or disengaging on the waterpik.

Figures 4A, 4B:
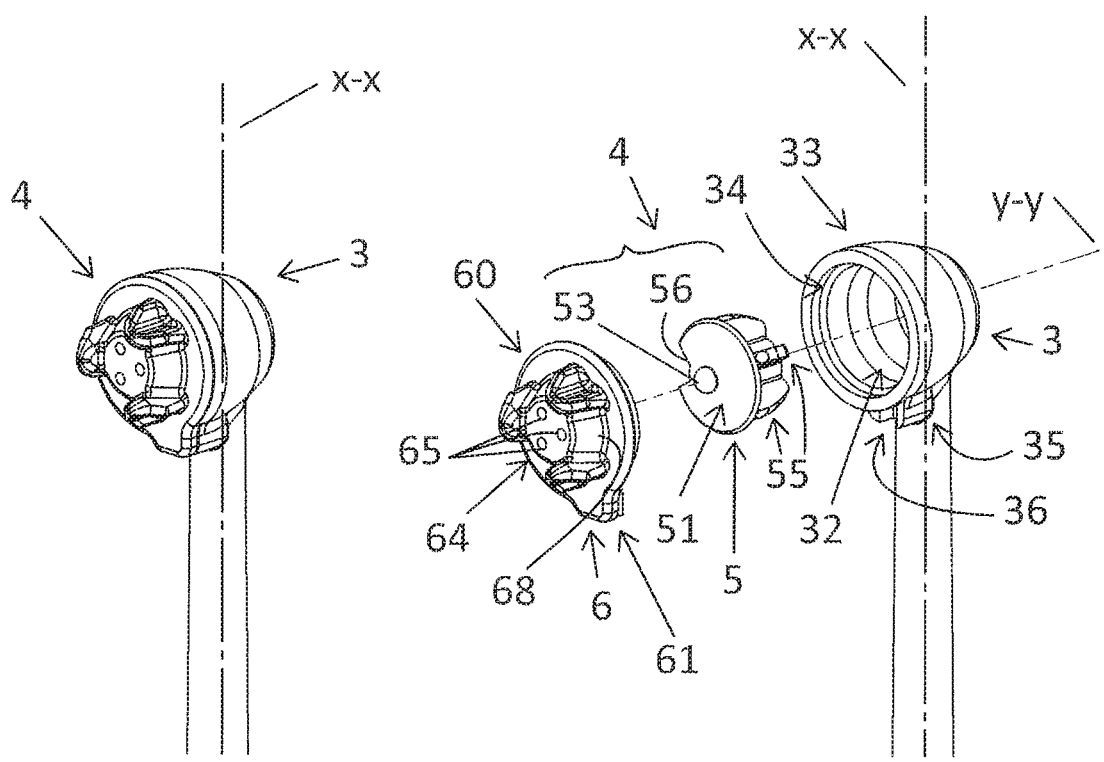
FIG. 4A is a schematic axonometric and exploded view of a water supply nozzle for oral hygiene for a dispensing nozzle according to the present invention.
FIG. 4B is a schematic axonometric view of the nozzle of the assembled FIG. 4A.
Figure 5:
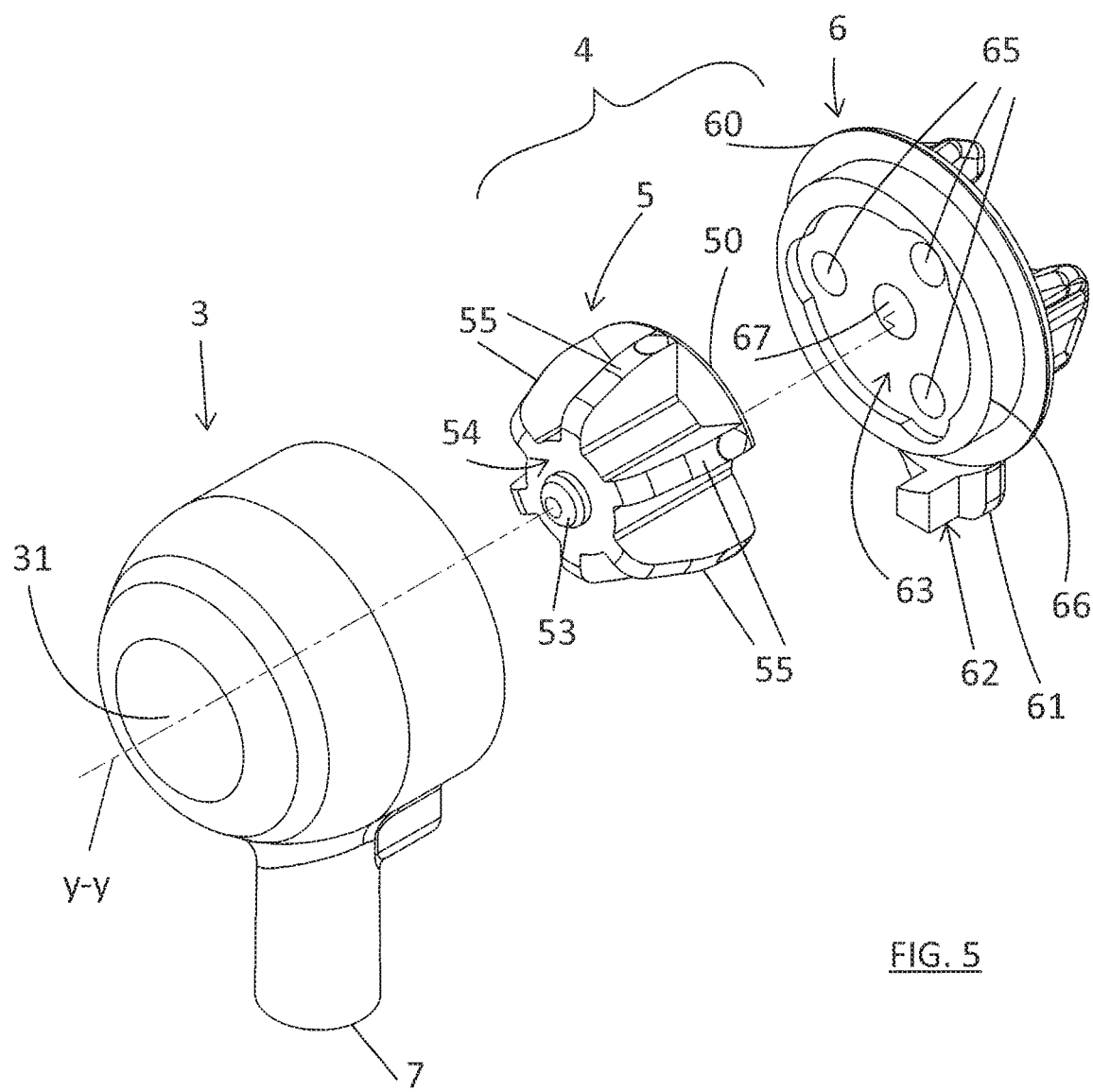
FIG. 5 is a schematic axonometric view of a detail of the nozzle in FIG. 4A according to a different angle.

The second end (3) as shown in FIGS. 4A and 4B, is preferably shaped like a cup with a bottom (31) (as shown in FIG. 5) and a circular opening (32) arranged along a substantially orthogonal Y-Y axis to the longitudinal X-X axis of the nozzle (1). On the inner surface of the bottom (31), a circular seat (not shown) is provided for receiving a first semi-spherical rotating pin of a rotating element (5) of the head (4) as described below. The inner surface of the side wall (33) of the second end (3) is also provided with an annular step (34) protruding towards the Y-Y axis in order to create the first sealing fastening means that work together with the second sealing fastening means provided on a closure cap (6) of said opening (32) of the second end (3) of nozzle (1).

Preferably, on the outer surface of the side wall (33), there is a notch (35) of reference for the correct positioning of the closure cap (6). The notch (35) is more preferably provided with a groove (36) for the engagement with a corresponding tooth of the cap (6) as explained below.

The head (4) conveniently comprises a rotating element (5) pivotally accommodated in the aforementioned second end (3) of the nozzle (1). In particular, this element (5) comprises a water flow diverter disc (50) that cooperates with a perforated closure cap (6) for the opening (32) of the second end (32) to dispense water at a predetermined distance from the outer surface of said cap and according to a predetermined angle α, β, γ with respect to the axis of rotation of the rotation element (5).

The rotating element (5) has a cross-section, namely, a section along an orthogonal plane to the Y-Y axis, generally circular and has a first face (51) (FIG. 4A) facing the cap (6) and a second face (52) (FIG. 5) facing towards the inner surface of the bottom (31) of the second end (32). Both faces (51) and (52) are provided with a respective protruding pivot pin (53) (54) with the respective surfaces of the cap (6) and the bottom (31) to allow the element (5) to rotate freely within the second end (32) on the Y-Y axis common to said pins (53) (54). In addition, the first (51) and second (52) faces are connected by means of a plurality of fins (55) which the water coming from the dispensing device pushes against to move the rotating element (5).

It should be noted that the first face (51) is represented by the external face of the water flow diverter disc (50). This disc has a circumferential cut (56) (FIG. 4A) extending between the rotation pin (53) and the outer circumference of the disc for a predetermined portion or sector of the disc. For example, this cut (56) extends about 120°, that is, about one-third of the circumference, since it has been proven that such an arrangement results in an improved cleaning effect than that obtained with nozzles according to the known technique. Additional angular amplitudes may, however, be expected according to particular needs or preferences.

As previously explained, the head comprises a closure cap (6) of the second end (3). The cap is of a substantially circular shape with a circumferential edge (60) complementary to the opening (32) of said second end (3). Preferably, said edge (60) is provided with a centering notch (61) which cooperates with the notch (35) of the second end (3). More preferably, the notch (61) has a tooth (62) (FIG. 5) for engaging in the groove (36) of the notch (35) of the second end (3). In particular, the cap (6) comprises a first opening face (63) (FIG. 5) for the opening (32) opposite to a second face (64) (FIGS. 4A and 7A-7B) for the dispensing of the clean water jets. The first (63) and second (64) faces are crossed by a plurality of holes for the dispensing of pressurized water jets (65) for the cleaning.

The first face (63) is provided with a protruding annular edge (66) that represents the aforementioned second means of engaging that cooperate with the first means of engaging or annular step (34) of the second end (3) to provide a sealing closure for the second end itself. The first face (63) is also provided with a semispherical seat (67) for engagement with the rotation pin (53) of the first face (51) of the rotating element (5) previously described.

The second face (64) comprises a protrusion (68), preferably a conical trunk, of which said holes (65) for the water dispensing open up on the free surface (68A). For example, these holes (65) are distributed on the free surface and form the vertices of an equilateral triangle, in other words, they are distributed over the surface along a circumference of 120° of distance from each other (FIG. 6).

Figure 6:
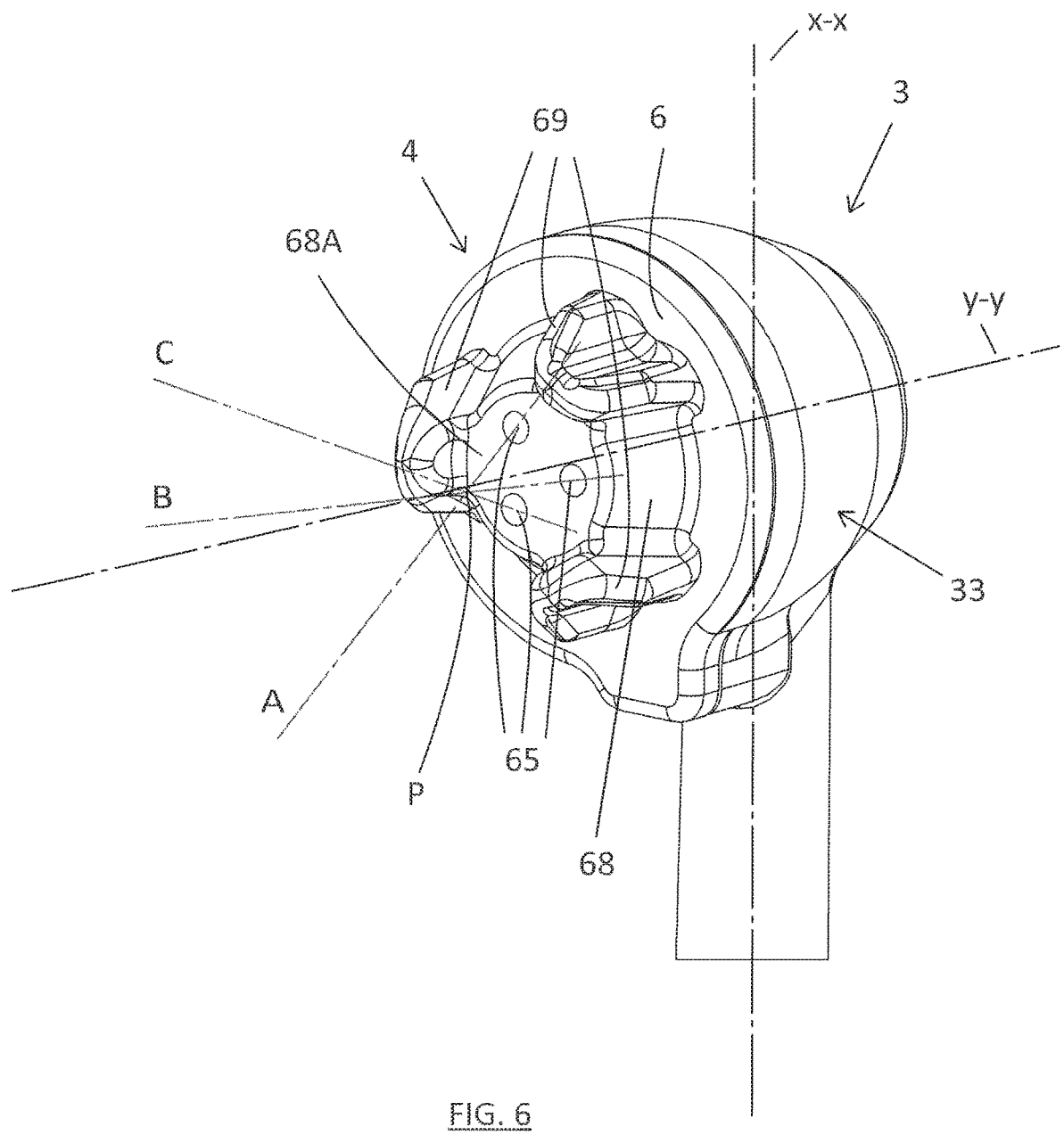
FIG. 6 is a schematic axonometric view of a detail of the nozzle in FIG. 4B highlighting the direction of each of the water jets.

In accordance with a preferred embodiment, as best shown in FIG. 6, the protrusion (68) is surrounded by supporting elements (69). These elements can be made up of rounded teeth that protrude with respect to the protrusion itself and act as a sort of support of the head (4) on the tooth or gum in order to ensure the correct position of use. In fact, their height or distance along the Y-Y axis with respect to the dispensing holes (65) is to ensure that when the head is resting on the tooth or gums, the jet of water coming out of each hole converges onto the predetermined point for maximum cleaning effectiveness.

In other words, as shown in FIGS. 6 and 7A-7B, the water dispensing holes (65) are provided so as to deliver water jets A, B, and C converging towards the Y-Y axis of the head (4) at point (P) that is located at a predetermined distance from the holes itself.

Preferably, said holes have an internal channel at the cap (6) (not shown) that is configured to send a jet of water at an angle to the free surface (68A) of the protrusion (68) of the cap (6) so that it reaches said convergence at point P. Alternatively, the inner channel is perpendicular to the free surface but the same surface is inclined in a manner so that it may reach the same target.

In accordance with an embodiment, as shown in FIGS. 8A-8C, the head (4) may include a disc-shaped cap (8) for the closing of the opening (32) of the second end (3) of the water dispensing nozzle (1). This cap (8) is provided, as with said cap (6), of a first closing face (80) opposite a second face (81) for water dispensing. An external peripheral edge (82) is then provided with a notch (83) centering with the notch (35) of the second end (3) of the nozzle (1). Preferably, the notch (83) comprises a tooth (84) engaging with the groove (36) of the notch (35), again, of the second end (3).

In addition, the first face (80) has an annular projection (65) of interlocking engagement with the step (34) of the opening (32) to create a water seal and a plurality of holes (not shown) for the water dispensing.

The second face (81) is basically a flat disc containing a plurality of holes for the water dispensing (86) corresponding to the holes of the first face. In particular, these holes are distributed in a central portion of the face, while peripherally there are a plurality of bristles (87) for the removal or plaque or food residue.

As previously explained, even the plurality of holes (86) is also configured to deliver water jets that converge at a point P located at a predetermined distance. The attainment of the said converging jets, as well as point P, is accomplished in the same manner as explained above. Even the number of holes and their distribution with respect to the Y-Y axis is identical to what has already been explained.

As an alternative to the just exemplified cap (8), the head (4) of the nozzle according to the present invention may include a cap that is completely similar to the cap (6) described with reference to FIGS. 7A, 7B, and in addition a hood (not shown) which is inserted onto said cap (6). The hood fits on the circumferential edge (60) of the cap (6) from its second face (64) and shows a first face of engagement with said second face (64) and a second face opposite the first and comprises a plurality of holes and a plurality of bristles completely identical to the holes (86) and bristles (87) described with reference to the cap (8) of FIGS. 8A-8C.

In accordance with a different embodiment, as shown in FIGS. 9A-9C, a cap (9) generally corresponds to the cap (8) previously described with reference to FIGS. 8A-8C. In particular, the cap (9) can be modified with respect to cap (8) so as to include an additional plurality of through holes (90) arranged preferably along an external circumference with respect to the holes (91) for the water dispensing converging at said point P. Moreover, the cap is provided with bristles (92) arranged to surround said plurality of holes (90).

The additional plurality of holes (91) serves to dispense rinsing water when toothpaste for brushing is used on the teeth via the bristles (92). This system becomes very convenient for it does not force the user, especially senior persons or those with back problems, to bend under the faucet to rinse out a mouth full of toothpaste with water, as usual. Therefore, these holes (91) do not require particular configurations in order to deliver pulsing jets of water converging at one specific point. On the contrary, their function is to dispense water on a surface as wide as possible or at least on the surface covered by the bristles (92).

Figure 10:
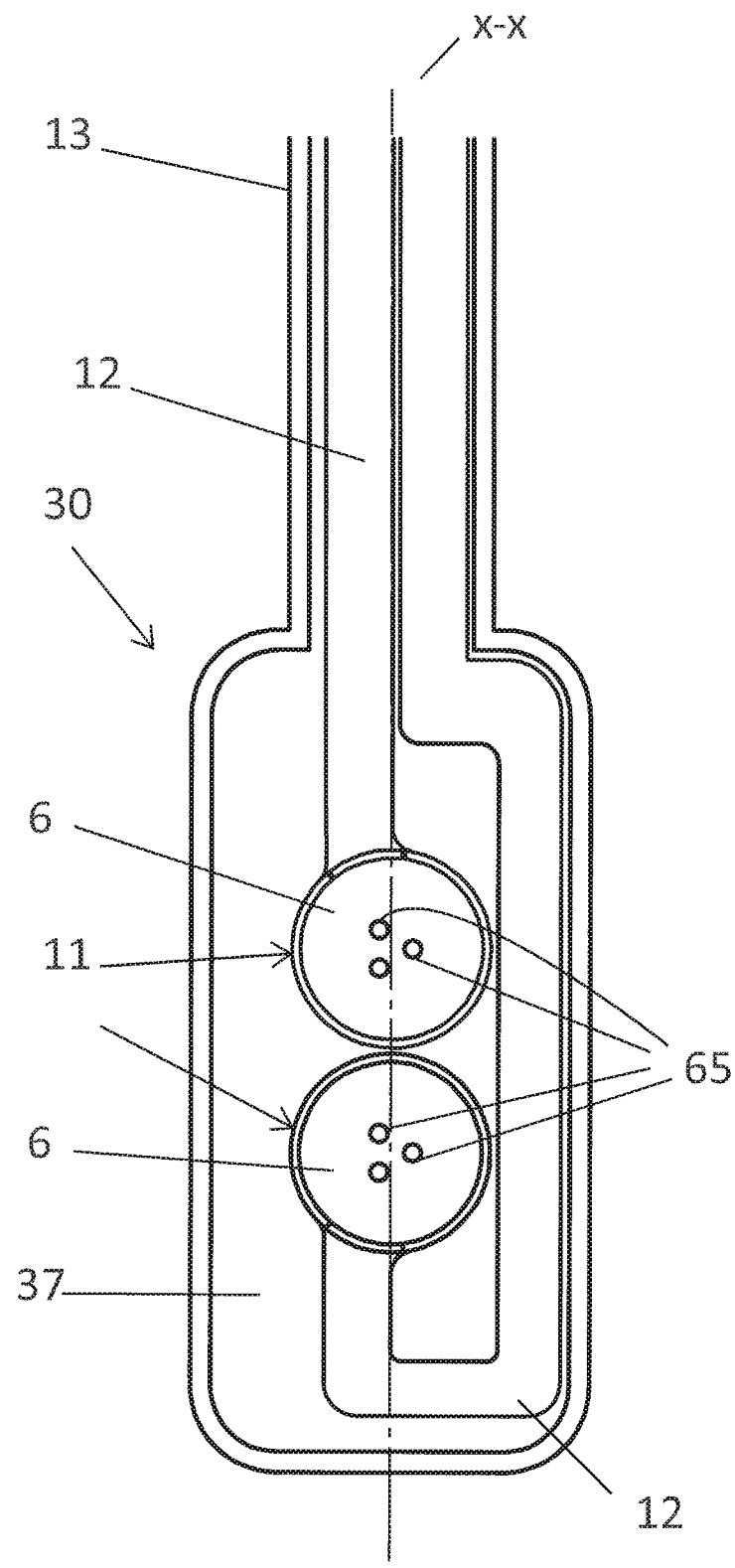
FIG. 10 is a schematic plan view of one end of the head of the nozzle of FIG. 4A, according to a fourth embodiment of the construction of the invention.

A fourth embodiment of the invention is shown in FIG. 10, wherein the second end (30) of the dispensing nozzle (not shown) has an elongated shape along the longitudinal X-X axis of the nozzle itself. Preferably, the form is parallelepiped with a larger rectangular base. On one of the main rectangular faces (37), two seats are provided for the acceptance of a plurality of heads (11), preferably two, of the water supply identical to the previously described head (4). It should be noted that these heads (11) are aligned along the X-X axis and each is powered by a corresponding water supply duct (12) from the hollow body (13) of the dispensing nozzle. Each duct comprises a Venturi portion and a respective hole for the air intake, as previously described.

The advantage of this embodiment lies in the fact that with two heads it is possible to mulheadly the fine cleaning effect previously described for it is possible to place into motion the rotating element (5) of the heads in two opposite directions, for example, inverting the inclination of the fins (55) in order to obtain a better leverage effect for the removal of food residue or plaque.

In addition, the heads (11) may be modified with the previously described components, such as the cap and hood with or without the bristles and the additional holes for rinsing.

Figure 11:
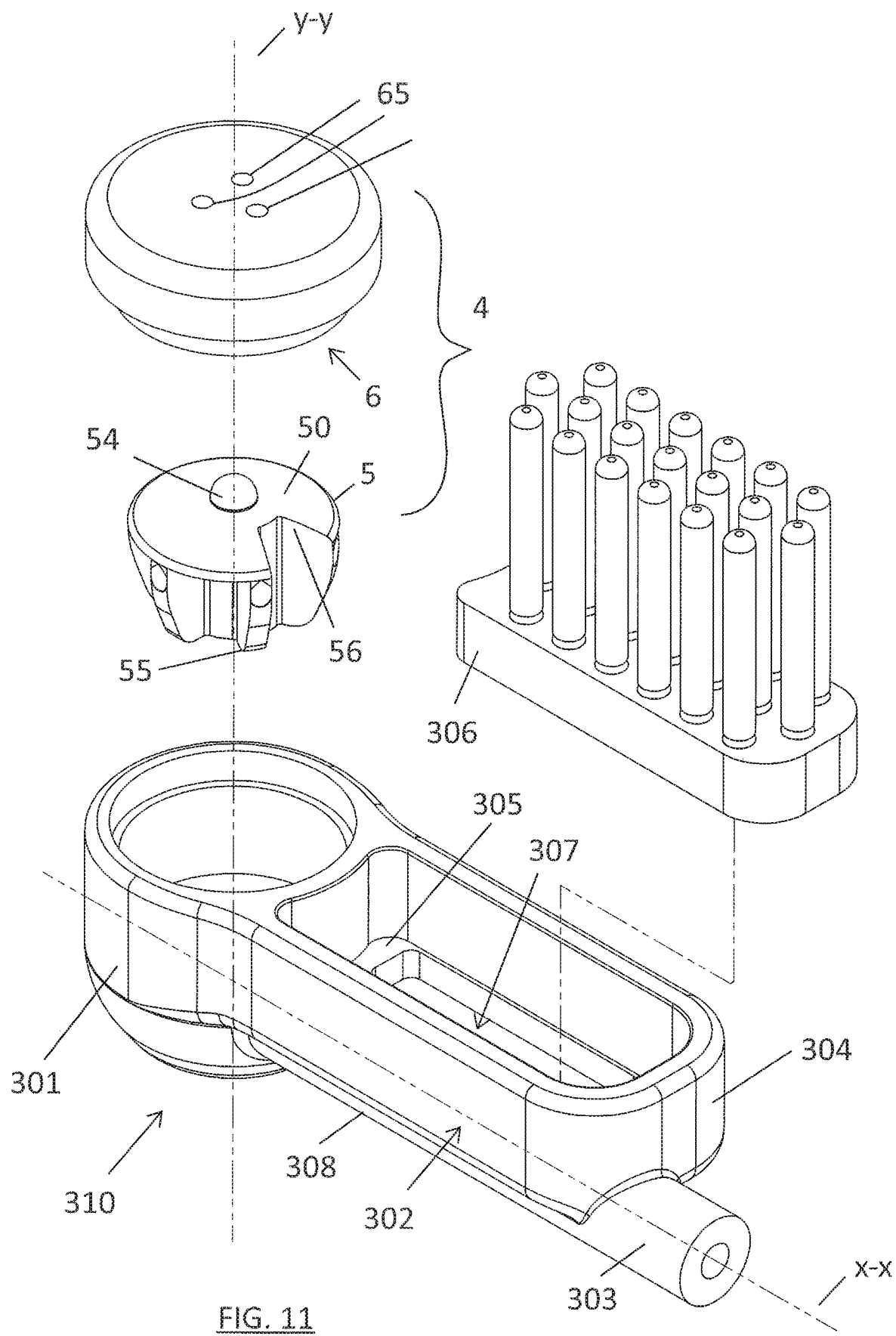
FIG. 11 is a schematic and exploded view of one end of the head of the nozzle of FIG. 4A, according to a fifth embodiment of the construction of the invention.
Figure 13D:
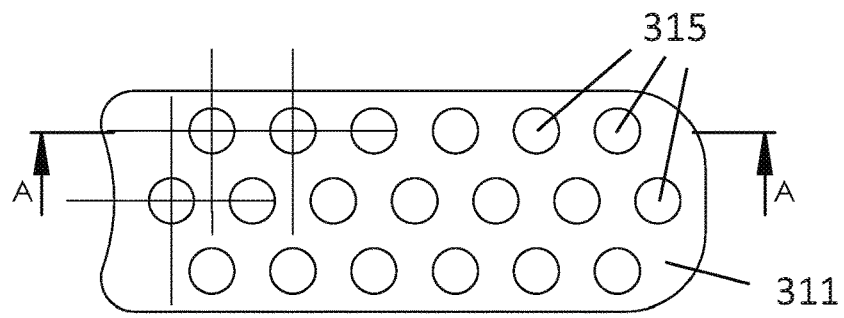
FIGS. 13A-13D respectively represent an axonometric, lateral, planar and sectional view along the A-A line of the plan view of an additional element of the head of FIG. 12.
Figure 13C:
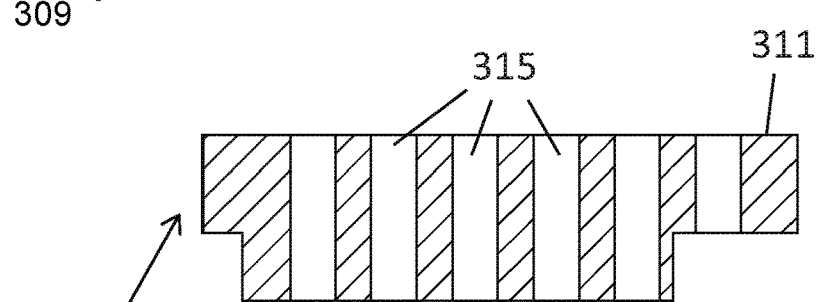
Figure 13B:
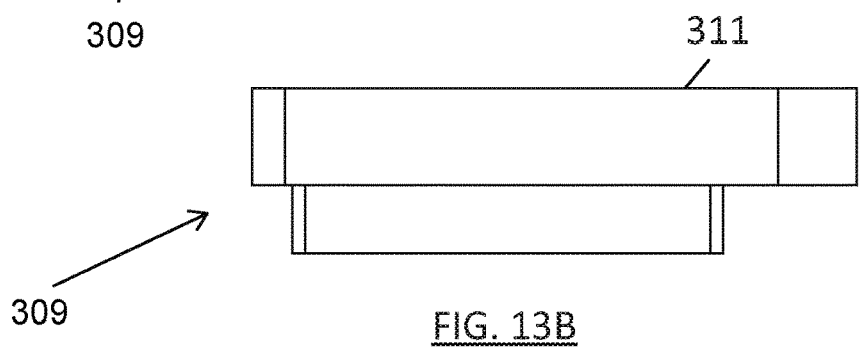
Figure 13A:
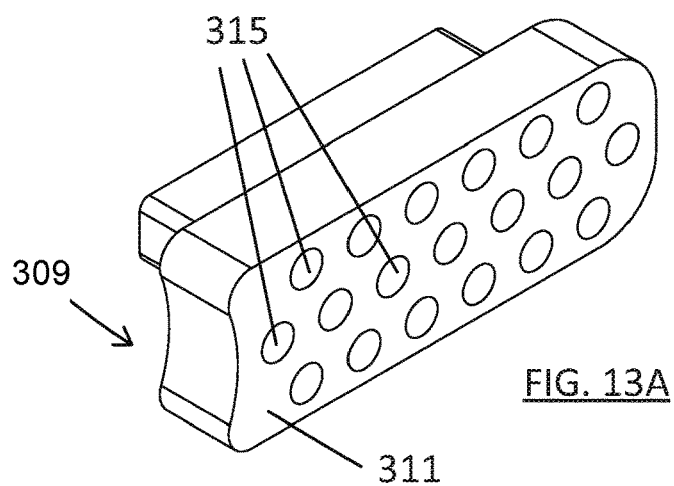

A fifth embodiment of the invention is shown in FIG. 11, wherein the second end (310) of the dispensing nozzle (not shown) is elongated along the X-X axis of the nozzle itself. As before, the second end (310) comprises a first cup-shaped portion (301) and a second portion (302) preferably in the form of a rectangular tray. The first and second portions are preferably aligned on the said X-X axis with the second portion (302) positioned between the first portion (301) and the hollow body (303) of the dispensing nozzle.

The first portion (301) is identical to the second cup-shaped one (3) previously described, and in addition, it comprises a head that is completely identical to the previously described head (4) and its components and variants. Therefore, the reference numbers shown in FIG. 11 correspond to the components of the head of FIGS. 4-7.

The second portion (302) comprises a side wall (304) that has a bottom (305) with a seat for the reversible enclosure of a coupling (306) for the bristles. In particular, the bottom (305) has an open portion (307) of engagement of said coupling (306) and a closed portion (308) which constitutes the channel for the passage of water from the body (303) to the cup (301) of the dispensing nozzle.

The coupling (306) comprises a support (309) with a first face (311) from which protrudes a plurality of bristles (312) and a second face (313) from which protrudes a reversible engagement foot (314) into the aforementioned open portion (307) of the second portion (302) of the end (310) of the nozzle (FIGS. 12A-12C).

As shown in FIGS. 13A-13D, the support (309) may be a general parallelepiped-shaped block of which the first face (311) has a series of blind or through holes (315) for the insertion of bristles (312) made of rubber, nylon or natural materials.

Additionally, the support (308) may be applied with a small sponge (not shown) soaked with an oral treatment fluid such as mouthwash. Alternatively, the sponge may receive from the dispenser or another device equipped with a container, a dental hygiene product so as to be soaked and to uniformly release the product in a highly effective and controlled manner without waste.

As is evident, the end (310) of the dispensing nozzle previously described allows for the great versatility of use thanks to a simple and combined construction in order to allow for the assembly of various components that allow integrated treatments in order to obtain a complete oral hygiene.

According to an embodiment of the invention, as shown in FIGS. 1-3, the second end (3) is preferably bent so as to be inclined with respect to the X-X axis and ends with a nozzle (400) for the dispensing of the air/water mixture for the removal of plaque and food residue and the contemporary disinfectant/hygienic treatment, in substitution of the aforementioned cleaning head (4). The nozzle (400) is a conventional hole, preferably surrounded by a plurality of teeth (410) (FIG. 2) that supports the tooth or gum to be treated in order to avoid the complete blockage of the nozzle itself.

Advantageously, the elongated portion or body of the nozzle (7) comprises an inner surface (71) that has a differentiated cross-section. In particular, this inner surface (71) comprises a first portion (72) that extends substantially in proximity to the first end (2) of the nozzle and has a constant diameter, a second portion (73) that instead extends from the second end (3) toward the first end (2), which also has a constant diameter, and a third intermediate portion (74) between said first and second portions.

In particular, as shown in detail in FIG. 2, the third portion (74) is characterized by a narrowing (75) directed toward the second portion (73) followed by an enlargement (76), always facing toward the second portion. In other words, the third intermediate portion (74) between the first portion (72) upstream of the water supply and the second portion (73) downstream, is a Venturi-shaped tube facing the nozzle (400) of the water supply.

In fact, the body wall (7) of the nozzle comprises a hole (77) (details of FIGS. 1 and 2) which places in communication the outer environment with the hollow inner surface of the body itself in order to allow air intake for the venturi effect. For this purpose, the hole (77) is positioned at the beginning of the enlargement (76) of the third portion (74) so that the passage of the pressurized water from the narrowing (75) to the enlargement (76) along the X-X axis of the nozzle draws in the air from the exterior through the hole (77), mixing it with the water in the form of microbubbles.

Preferably, the hole (77) has a circular opening surrounded by a plurality of protuberances (78) that generally extend orthogonally to the X-X axis in order to create spacer elements to prevent accidental blockage of the hole during the use of the nozzle. In fact, these protuberances are separated from each other by lateral grooves (79) that allow the passage of air even when the protuberances should be located with their free edge in support of a user's lips or face. In addition, there is a free edge that is beveled in order to avoid the scratching of the user's lips or face (FIG. 3).

Preferably, the hole (77) has an inner wall provided with narrowings (590) (more visible in detail in FIG. 1) designed to create a narrowing that accelerates the air intake into the venturi tube or the intermediate portion (73) of the inner wall (71) of the body (7) of the nozzle (1).

In addition, the Z-Z axis (FIG. 2) of the hole (77) is preferably orthogonally directed toward the axis X-X of the body (7), that is, orthogonally with respect to the direction of the flow of water passing through the nozzle (1) from the first end (2) to the second end (3) to the flow out of the nozzle (400).

Figure 3B:
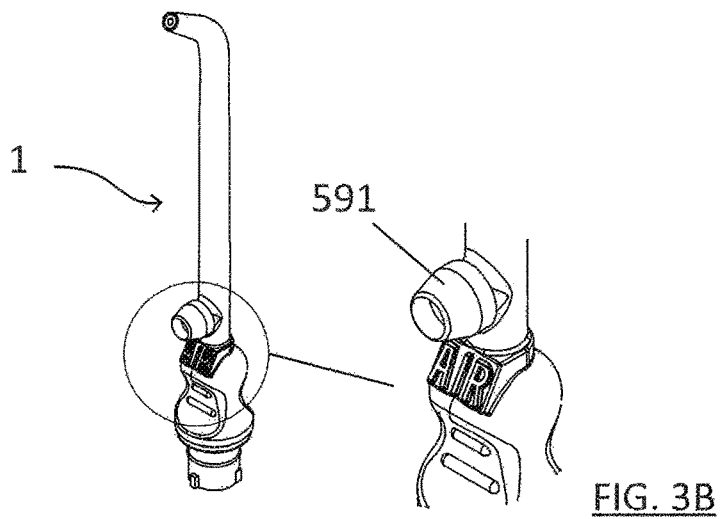
FIG. 3B is a schematic axonometric view from the top of the nozzle in FIG. 1 with an enlarged detail, according to a variation of the construction.
Figure 3C:
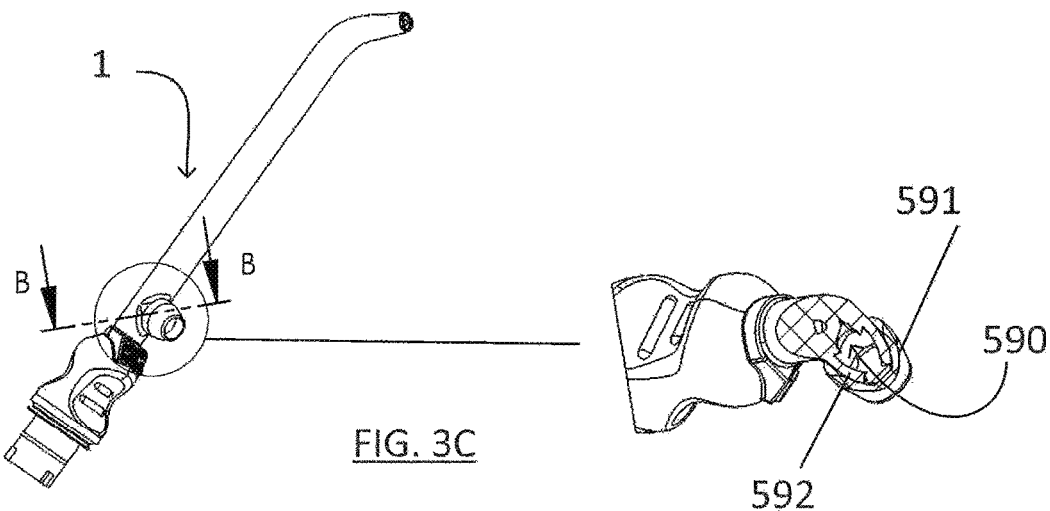
FIG. 3C is a schematic axonometric view of the nozzle in FIG. 3B at a different angle with a sectional detail.

As schematically shown in FIGS. 3B and 3C, the hole (77) may be engaged by a non-return valve (593) in order to prevent accidental water spillage that flows inside the body (7) of the nozzle (1). The valve can be any non-return valve known in the fluid-dynamics sector, such as a diaphragm which bends towards the interior of the nozzle (1) and opens the hole (77) in order to allow air intake and, vice versa, bends towards the exterior and closes the said hole in order to prevent the water flowing inside with a pressure greater of the air pressure flowing out of the same hole (77). Alternatively and solely for example, the valve may be sphere shaped and operate in a similar manner. Also, preferably, the valve is housed in a ring (592) protruding from the wall of the body (7) of the nozzle (1) and an axially open cylindrical sleeve (591) is inserted onto said ring. It would be more preferable if the sleeve (591) is made of silicone or soft rubber.

From what has been explained so far, it is evident that the reported drawbacks in the introductory part of this description have been overcome and important advantages have been achieved.

In fact, the arrangement of the venturi duct within the hollow body of the dispensing nozzle with an opening for the external air intake makes it possible to advantageously obtain a mixture with the water flowing into the said hollow body and wafted air from the outside without the use of extra appliances or systems that are electrically powered. As a result, the entire structure of the dispensing device is considerably simplified with savings of production costs and the complete elimination of the risks of malfunctioning or maintenance.

In addition, as previously explained, the dispensing nozzle of the present invention is simple from a constructive point of view and easy to apply to any type of water supply system.

Its use is also quite simple and does not require any specific attention or preparation from its users.

The projection or support system around the air intake holes will help prevent inadvertent blockages of the same that could affect the air/water mixture.

In particular, with the unique predisposition of the alternating water jets converging at a selected single point and at different angles, it is possible to obtain a sort of vortex effect around the cleaning zone so as to significantly increase the cleaning effectiveness of the water dispensed under pressure. In fact, it has been verified that this alternating action at a single point and at different angles manages to remove the most hidden plaque and food residue in narrow and tight spaces between contiguous teeth and respective gums.

In addition, the predisposition of spacer elements on the tooth or gum allows it to automatically calibrate the converging point of impact of the aforementioned water jets without forcing the user to worry about correctly positioning the nozzle.

Similarly, the rotating disk allows for the dispensing of water in an equally automatic way with the aforementioned alternating effect in a simple and reliable manner.

The addition of an element with bristles also allows it to advantageously increase the cleaning effect even further thanks to the mechanical action of the bristles.

Therefore, the dispenser nozzle is particularly versatile, adaptable and complete for optimal dental hygiene. In addition, the nozzle can be used on any type of handle of any type of waterpik available on the market by a simple adaptation of the first end of the coupling to the waterpiks.

Further variants of the nozzle of the invention may be carried out by an the skilled person in the art while remaining within the scope of protection as defined by the appended claims. For example, it is possible to expect the application of the aforementioned nozzle to a conventional electric toothbrush that has an internal water intake system.

For example, a plurality of bristles may be provided directly around the protrusion (68) of the cap (6) as shown in FIGS. 7A and 7B.

The protrusion (68) may be eliminated and the outlet holes can be obtained directly on the flat surface of the second face (64) of the cap (6).

The angle of the water jets and their point of conjunction may vary according to particular needs or preferences, for example, by a particular conformation of the dental arch of a person.

The materials which the nozzle of the invention is made of may vary according to specific requirements, but in any case, they will be materials suitable for oral hygiene and certified by the Ministry of Health for this purpose. They are plastic materials commonly used, for example, for the production of conventional manual or electric toothbrushes.

Even the shapes may also be subject to custom modifications, as long as the pulsating or alternating effect of the jets with different angles and convergents in a single predetermined point remains pre-established, in order to obtain the aforementioned vortex effect and/or the aforementioned venturi effect.

Furthermore, it is to be understood that any combination of variants of the venturi system and the head system with alternating and converging jets are equally the object of the present invention.

The invention claimed is:

1. A water supply nozzle, for oral hygiene that extends longitudinally along an axis, the water supply nozzle comprising:
   a first end for connecting to a pressurized water supply device,
   a second end of a pressurized water outlet joined to the first end by a body having a body wall,
   the second end carrying a cleaning head, and the second end being provided with a closed bottom and an opening,
   the head comprising a rotating element that is rotatably received at the second end and being provided with a water flow diverter disc, and
   a closure cap of the opening of the second end, in turn, comprising a plurality of holes of the pressurized water outlet which are selectively activated by the water flow diverter disc to converge the water at a point at a predetermined distance from an outer surface of the cap and at a predetermined angle with respect to an axis of rotation of the rotating element,
   wherein the cap is provided with a first closing face opposite a second face of water supply nozzle, the second face comprises the plurality of holes distributed in a central portion of the second face, while a plurality of bristles are peripherally provided for removal of plaque and food residue.

2. The water supply nozzle according to claim 1, wherein the body comprises an inner surface, a first portion extends in proximity to the first end and has a constant diameter, a second portion instead extends from the second end toward the first end, also having a constant diameter, and a third portion, intermediate between the first and second portions, in turn comprises a narrowing facing toward the second portion followed by an enlargement, always facing toward the second portion, and the body wall further comprising a hole for air intake at the third portion.

3. The water supply nozzle according to claim 2, wherein the hole has a circular opening surrounded by a plurality of protuberances that generally extend orthogonally to the axis so as to create spacer elements to prevent accidental occlusion of the hole during use of the water supply nozzle.

4. The water supply nozzle according to claim 2, wherein the hole comprises an inner wall with narrowings designed to create a narrowing that accelerates the air intake into an intermediate portion of an inner wall of the body of the water supply nozzle.

5. The water supply nozzle according to claim 1, wherein the rotating element has a first face facing towards an inner surface of the bottom of the second end and a second face facing towards the cap, both the first and second faces are provided with a respective protruding pin for engagement with respective bottom surfaces and the cap in order to allow the rotating element to rotate freely within the second end on an axis common to the pins by a plurality of fins that connect the first and second faces and against which, water originating from the pressurized water supply device, pushes in order to rotate the rotating element.

6. The water supply nozzle according to claim 5, wherein the water flow diverter disc has a circumferential cut that extends between the protruding pins and an outer circumference of the water flow diverter disc for a predetermined portion or sector of the water flow diverter disc.

7. The water supply nozzle according to claim 1, further comprising supporting elements that surround the plurality of holes.

8. The water supply nozzle according to claim 1, wherein the second end comprises seats for acceptance of a plurality of heads of water supply, each being powered by a corresponding duct.

9. The water supply nozzle according to claim 1, wherein the second end comprises a first cup-shaped portion for receiving the head and a second portion that comprises a side wall that has a bottom with seats for receiving a reversible enclosure of a coupling for the plurality of bristles.

10. A water supply nozzle for oral hygiene that extends longitudinally along an axis, comprising:
   a first end for connecting to a pressurized water supply device,
   a second end of a pressurized water outlet joined to the first end by a body having a body wall, and the body comprising an inner surface in which a first portion extends in proximity to the first end and having a constant diameter, a second portion extending from the second end towards the first end, and the second end also having a constant diameter, and a third portion, intermediate between the first and second portions, which in turn comprising a narrowing facing towards the second portion followed by an enlargement, always turned towards the second portion, the body wall further comprising a hole for air intake at the third portion, wherein the second end carries a cleaning head, the second end is provided with a closed bottom and an opening, the head includes a rotating element that is rotatably received at the second end and provided with a water flow diverter disc, and a closure cap of the opening of the second end, in turn, comprises a plurality of holes, the pressurized water outlet being selectively activated by the water flow diverter disc to converge the water at a point at a predetermined distance from an outer surface of the cap and at a predetermined angle with respect to an axis of rotation of the rotating element.

* * * * *